United States Patent
Park et al.

(10) Patent No.: US 12,537,196 B2
(45) Date of Patent: Jan. 27, 2026

(54) POSITIVE ELECTRODE ACTIVE MATERIAL FOR SECONDARY BATTERY AND LITHIUM SECONDARY BATTERY INCLUDING THE SAME

(71) Applicant: LG Energy Solution, Ltd., Seoul (KR)

(72) Inventors: Sang Min Park, Daejeon (KR); Eun Sol Lho, Daejeon (KR); Sung Bin Park, Daejeon (KR); Seul Ki Kim, Daejeon (KR); Wen Xiu Wang, Daejeon (KR); Wang Mo Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 192 days.

(21) Appl. No.: 17/795,049

(22) PCT Filed: Jan. 19, 2021

(86) PCT No.: PCT/KR2021/000733
§ 371 (c)(1),
(2) Date: Jul. 25, 2022

(87) PCT Pub. No.: WO2021/153936
PCT Pub. Date: Aug. 5, 2021

(65) Prior Publication Data
US 2023/0095804 A1    Mar. 30, 2023

(30) Foreign Application Priority Data
Jan. 29, 2020 (KR) ................. 10-2020-0010693

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/505* (2013.01); *H01M 10/0525* (2013.01);
(Continued)

(58) Field of Classification Search
CPC .. H01M 4/525; H01M 4/505; H01M 10/0525; H01M 2004/028; H01M 2220/20
See application file for complete search history.

(56) References Cited

U.S. PATENT DOCUMENTS

| | | | |
|---|---|---|---|
| 9,979,014 | B2 | 5/2018 | Kim et al. |
| 2014/0038053 | A1 | 2/2014 | Endo et al. |

(Continued)

FOREIGN PATENT DOCUMENTS

| | | |
|---|---|---|
| CN | 106532005 A | 3/2017 |
| EP | 4064391 A1 | 9/2022 |

(Continued)

OTHER PUBLICATIONS

Extended European Search Report including Written Opinion for Application No. 21747329.7 dated May 30, 2023, pp. 1-6.
(Continued)

*Primary Examiner* — Sean P Cullen
*Assistant Examiner* — Jonathan William Estes
(74) *Attorney, Agent, or Firm* — Fish & Richardson P.C.

(57) ABSTRACT

A positive electrode active material, and a positive electrode and a lithium secondary battery including the same are disclosed herein. In some embodiments, a positive electrode active material includes a lithium composite transition metal oxide containing nickel, cobalt, and manganese and having a nickel content for 60 mol % or more, based on metals (M) excluding lithium, and is in the form of single particles having an average particle diameter ($D_{50}$) of 1 to 10 μm, wherein a 100-nm region extending from the surface toward the center of a single particle has crystal structures of a
(Continued)

Fd3M and a Fm3m space group, and a phase ratio is 0.2 to 0.7, which is a ratio of a first portion of a maximum straight length of the 100-nm region occupied by the crystal structure of the Fd3M space group to a second portion occupied by the crystal structure of the Fm3m space group.

10 Claims, 1 Drawing Sheet

(51) Int. Cl.
  *H01M 4/505* (2010.01)
  *H01M 10/0525* (2010.01)
(52) U.S. Cl.
  CPC .............. *H01M 2004/021* (2013.01); *H01M 2004/028* (2013.01); *H01M 2220/20* (2013.01)

(56) References Cited

U.S. PATENT DOCUMENTS

| | | |
|---|---|---|
| 2014/0045067 A1 | 2/2014 | Cho et al. |
| 2016/0181611 A1* | 6/2016 | Cho ............... H01M 4/366 429/223 |
| 2017/0288223 A1 | 10/2017 | Ogawa et al. |
| 2018/0175368 A1* | 6/2018 | Zhou ............... H01M 4/505 |
| 2018/0316006 A1 | 11/2018 | Kaneda et al. |
| 2018/0316009 A1 | 11/2018 | Park et al. |
| 2019/0006669 A1* | 1/2019 | Park ............... H01M 4/1391 |
| 2019/0020024 A1 | 1/2019 | Wang et al. |
| 2019/0221838 A1* | 7/2019 | Ishikawa ........ H01M 4/366 |
| 2020/0161633 A1 | 5/2020 | Zhou et al. |
| 2020/0203728 A1 | 6/2020 | Ogawa et al. |
| 2020/0239328 A1* | 7/2020 | Li ............... C01G 53/50 |
| 2020/0280065 A1 | 9/2020 | Jang et al. |
| 2020/0295367 A1 | 9/2020 | Yoo et al. |
| 2021/0083274 A1 | 3/2021 | Ishikawa et al. |
| 2021/0098776 A1 | 4/2021 | Kageura et al. |
| 2022/0149365 A1 | 5/2022 | Inoue et al. |
| 2022/0293939 A1 | 9/2022 | Ogawa et al. |
| 2023/0034497 A1 | 2/2023 | Park et al. |

FOREIGN PATENT DOCUMENTS

| | | |
|---|---|---|
| JP | H10233212 A | 9/1998 |
| JP | 6094797 B2 | 3/2017 |
| JP | 2017065975 A | 4/2017 |
| JP | 2018063951 A | 4/2018 |
| JP | 2018098173 A | 6/2018 |
| JP | 2019021627 A | 2/2019 |
| JP | 2019125575 A | 7/2019 |
| JP | 2019172530 A | 10/2019 |
| JP | 6630864 B1 | 1/2020 |
| KR | 20180070435 A | 6/2018 |
| KR | 20190003110 A | 1/2019 |
| KR | 20190035670 A | 4/2019 |
| KR | 20190059241 A | 5/2019 |
| KR | 20190068484 A | 6/2019 |
| KR | 20190069073 A | 6/2019 |
| WO | 2019117531 A1 | 6/2019 |

OTHER PUBLICATIONS

International Search Report for Application No. PCT/KR2021/000733 mailed Apr. 23, 2021, 2 pages.
Office Action in Korean Appln. No. 10-2024-0042122, mailed on Sep. 25, 2025, 16 pages (with English translation).

* cited by examiner

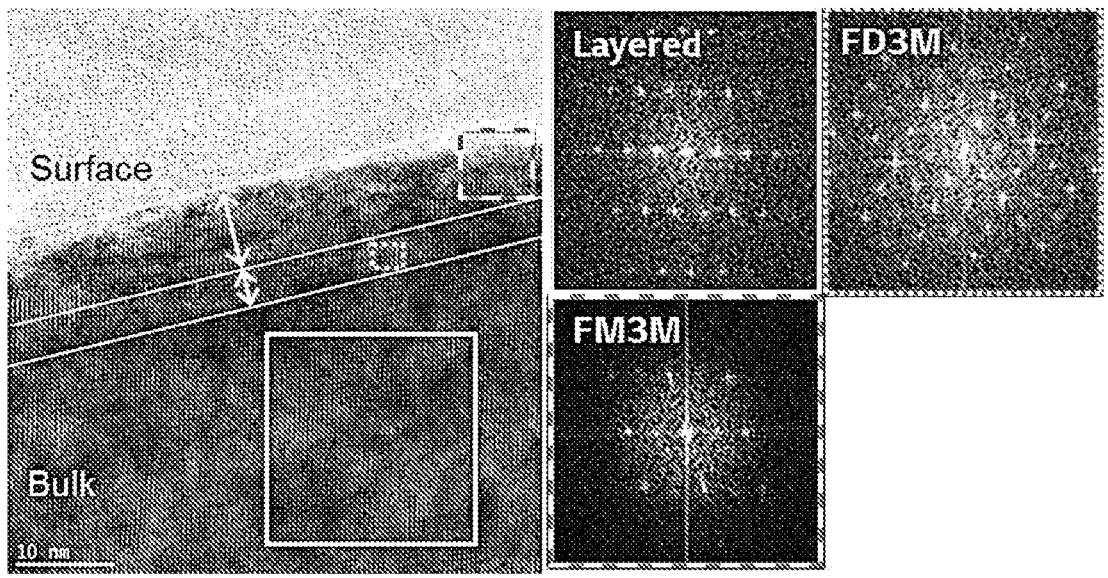

POSITIVE ELECTRODE ACTIVE MATERIAL FOR SECONDARY BATTERY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2021/000733, filed on Jan. 19, 2021, which claims priority from Korean Patent Application No. 10-2020-0010693, filed on Jan. 29, 2020, the disclosures of which are incorporated by reference herein.

TECHNICAL FIELD

The present invention relates to a positive electrode active material for a secondary battery and a lithium secondary battery including the same.

BACKGROUND ART

Recently, in response to the rapid spread of electronic devices using batteries, such as mobile phones, notebook computers, electric vehicles, and the like, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for enhancing the performance of lithium secondary batteries have been continuously made.

Lithium secondary batteries generate electrical energy through oxidation and reduction reactions when lithium ions are intercalated/deintercalated into/from a positive electrode and a negative electrode while an organic electrolyte solution or a polymer electrolyte solution fills an empty space between a positive electrode and a negative electrode which consist of active materials enabling the intercalation and deintercalation of lithium ions.

As positive electrode active materials for lithium secondary batteries, lithium-cobalt oxide ($LiCoO_2$), lithium-nickel oxide ($LiNiO_2$), lithium-manganese oxide ($LiMnO_2$, $LiMn_2O_4$, etc.), lithium-iron phosphate compound ($LiFePO_4$), and the like have been used. Among them, lithium-cobalt oxide ($LiCoO_2$) have been widely used due to having a high operating voltage and excellent capacity characteristics and applied as positive electrode active materials for high-voltage operation. However, lithium-cobalt oxide has a limitation in mass use as a power source in the electric vehicle field and the like due to an increase in price of cobalt (Co) and unstable supply thereof, and therefore, a need to develop positive electrode active materials that can replace lithium-cobalt oxides has been raised.

Accordingly, nickel-cobalt-manganese-based lithium composite transition metal oxide (hereinafter, simply referred to as "NCM-based lithium composite transition metal oxide"), in which a part of the cobalt (Co) is substituted with nickel (Ni) and manganese (Mn), has been developed. Recently, a study has been conducted to increase capacity by increasing a Ni content in the NCM-based lithium composite transition metal oxide. However, in the case of nickel (Ni)-rich positive electrode active materials having a high nickel content, as a nickel content increases, thermal stability is degraded, resistance increases due to side reactions increasingly occurring during an electrochemical reaction, and gas is increasingly generated.

To compensate for the problems, attempts have been made to improve problems, such as degradation of thermal stability and an increase in side reactions and resistance, by minimizing an interface of secondary particles by performing over-firing while increasing a firing temperature in the preparation of the positive electrode active material. However, when the degree of over-firing is not properly adjusted due to difficulty in controlling the over-firing performed while increasing a firing temperature, there is a problem of performance deterioration such as a degradation of charge/discharge efficiency, an increase in resistance, and the like.

RELATED-ART DOCUMENTS

Patent Documents (Patent Document 1) Korean Unexamined Patent Publication No. 2019-0068484

DISCLOSURE

Technical Problem

The present invention is directed to providing a positive electrode active material, which is a nickel (Ni)-rich NCM-based lithium composite transition metal oxide and is formed in the form of single particles through over-firing such that thermal stability is enhanced, side reactions and resistance are suppressed from being increased, and the surface characteristics of the particle are improved in the formation of the single particles, resulting in enhancement of charge/discharge efficiency, output characteristics, and high-temperature lifetime characteristics.

Technical Solution

One aspect of the present invention provides a positive electrode active material for a secondary battery, which is a lithium composite transition metal oxide containing nickel, cobalt, and manganese and having a nickel content accounting for 60 mol % or more of metals (M) contained in the lithium composite transition metal oxide, where M excluding lithium, and is in the form of single particles having an average particle diameter ($D_{50}$) of 1 to 10 μm, wherein a 100-nm region extending from the surface toward the center of a single particle of the lithium composite transition metal oxide has crystal structures of a Fd3M space group and a Fm3m space group, and a phase ratio is 0.2 to 0.7, where the phase ratio is a ratio of a first portion of the maximum straight length occupied by the crystal structure of the Fd3M space group to a second portion of the maximum straight length occupied by the crystal structure of the Fm3m space group, where the maximum straight length is determined from a cross-sectional image of a single particle, where the image is obtained using transmission electron microscopy (TEM), and where the maximum straight length is measured perpendicular to the surface of the single particle.

Another aspect of the present invention provides a positive electrode and a lithium secondary battery which include the above-described positive electrode active material.

Advantageous Effects

According to the present invention, a positive electrode active material, which is a nickel (Ni)-rich NCM-based lithium composite transition metal oxide, is formed in the form of single particles such that thermal stability is enhanced, side reactions and resistance are suppressed from being increased, and surface characteristics are improved by controlling the crystal structure of the particle surface in the formation of the single particles, resulting in enhancement of charge/discharge efficiency, output characteristics, and high-temperature lifetime characteristics.

DESCRIPTION OF DRAWINGS

The FIGURE is a transmission electron microscope (TEM) image of a cross section of a positive electrode active material prepared in Example 2.

MODES OF THE INVENTION

Hereinafter, the present invention will be described in more detail to facilitate understanding of the present invention. Terms and words used in this specification and the claims should not be interpreted as limited to commonly used meanings or meanings in dictionaries and should be interpreted with meanings and concepts which are consistent with the technological scope of the present invention based on the principle that the inventors can appropriately define concepts of terms in order to describe the invention in the best way.

In this specification, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. For example, the average particle diameter ($D_{50}$) of the positive electrode active material may be measured by dispersing positive electrode active material particles in a dispersion medium, inputting the dispersion into a commercially available laser diffraction particle size analyzer (e.g., Microtrac MT 3000), irradiating the same with ultrasonic waves at a frequency of about 28 kHz and an output of 40 W, and then calculating an average particle diameter ($D_{50}$) corresponding to 50% of the cumulative volume in the analyzer.

In this specification, a "positive electrode active material in the form of single particles" is a concept in contrast to a positive electrode active material in the form of a spherical secondary particle formed by agglomerating several tens to several hundreds of primary particles using a conventional method, and means a positive electrode active material formed of at most ten primary particles. Specifically, the positive electrode active material in the form of single particles used herein may be in the form of single particles formed of one primary particle or in the form of a secondary particle formed by agglomerating several primary particles.

In this specification, a "primary particle" means the smallest unit of a particle recognized when a positive electrode active material is observed through a scanning electron microscope, and a "secondary particle" means a secondary structure formed by agglomerating a plurality of primary particles.

In this specification, over-firing means firing performed at a temperature 50° C. to 200° C. higher than a generally proper firing temperature in the preparation of a positive electrode active material. For example, in the preparation of a lithium composite transition metal oxide having a Ni:Co:Mn molar ratio of 85:5:10 as a positive electrode active material, 690° C. to 790° C. is known as a generally proper firing temperature, but over-firing means firing performed at 800° C. to 900° C.

<Positive Electrode Active Material>

A positive electrode active material for a secondary battery according to the present invention is a lithium composite transition metal oxide containing nickel, cobalt, and manganese and having a nickel content accounting for 60 mol % or more of metals (M) excluding lithium and is in the form of single particles having an average particle diameter ($D_{50}$) of 1 to 10 μm, wherein a 100-nm region extends from the surface toward the center of a single particle of the lithium composite transition metal oxide has crystal structures of a Fd3M space group and a Fm3m space group, and a phase ratio of 0.2 to 0.7, where the phase ratio is a ratio of a first portion of a maximum straight length occupied by the crystal structure of the Fd3M space group to a second portion of the maximum straight length occupied by the crystal structure of the Fm3m space group, where the maximum straight length is determined from a cross-sectional image of a single particle, where the image is obtained using transmission electron microscopy (TEM), and where the maximum straight length is perpendicular to the surface of the single particle.

The positive electrode active material according to the present invention is an NCM-based lithium composite transition metal oxide containing nickel (Ni), cobalt (Co), and manganese (Mn). The lithium composite transition metal oxide is a nickel (Ni)-rich NCM-based lithium composite transition metal oxide having a nickel content accounting for 60 mol % or more of the total content of metals excluding lithium (Li). More preferably, a nickel (Ni) content may account for 70 mol % or more, and even more preferably, 80 mol % or more. When a nickel (Ni) content accounts for 60 mol % or more of the total content of metals (M) excluding lithium (Li) in the lithium composite transition metal oxide, higher capacity can be ensured.

The lithium composite transition metal oxide may be represented by the following Chemical Formula 1.

$$Li_aNi_{1-b-c-d}Co_bMn_cQ_dO_{2+\delta}$$ [Chemical Formula 1]

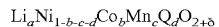

In Chemical Formula 1, Q is any one or more selected from the group consisting of Al, Mg, V, Ti, and Zr, and 1.0≤a≤1.2, 0<b≤0.4, 0<c≤0.3, 0≤d≤0.1, 0<b+c+d≤0.4, and −0.1≤δ≤1.0.

In the lithium composite transition metal oxide represented by Chemical Formula 1, Li may be contained in an amount corresponding to a, that is, satisfying 1.0≤a≤1.2. When a is less than 1.0, there may be a risk that capacity may be degraded, and when a exceeds 1.2, particles are sintered in a firing process, and thus it may be difficult to prepare a positive electrode active material. In consideration of the balance between remarkableness of the effect of improving capacity characteristics of the positive electrode active material according to control of Li content and sinterability in the preparation of the active material, Li may be more preferably contained in an amount satisfying 1.1≤a≤1.2.

In the lithium composite transition metal oxide represented by Chemical Formula 1, Ni may be contained in an amount corresponding to 1−(b+c+d), for example, satisfying 0.6≤1−(b+c+d)<1. When a Ni content in the lithium composite transition metal oxide represented by Chemical Formula 1 is 0.6 or more, a Ni amount sufficient to contribute to charging and discharging is ensured, and thus an increase in capacity can be promoted. More preferably, Ni may be contained in an amount satisfying 0.80≤1−(b+c+d)≤0.99.

In the lithium composite transition metal oxide represented by Chemical Formula 1, Co may be contained in an amount corresponding to b, that is, satisfying 0<b≤0.4. When a Co content in the lithium composite transition metal oxide represented by Chemical Formula 1 exceeds 0.4, there may be a risk that costs may increase. Considering that the inclusion of Co has the effect of remarkably improving capacity characteristics, Co may be contained, more specifically, in an amount satisfying $0.05 \leq b \leq 0.2$.

In the lithium composite transition metal oxide represented by Chemical Formula 1, Mn may be contained in an amount corresponding to c, that is, satisfying $0<c \leq 0.3$. When c in the lithium composite transition metal oxide represented by Chemical Formula 1 exceeds 0.3, there may be a risk that the output characteristics and capacity characteristics of a battery may rather be degraded. Mn may be contained, more specifically, in an amount satisfying $0.05 \leq c \leq 0.2$.

In the lithium composite transition metal oxide represented by Chemical Formula 1, Q may be a doping element included in the crystal structure of the lithium composite transition metal oxide and may be contained in an amount of corresponding to d, that is, satisfying $0 \leq d \leq 0.1$.

The positive electrode active material, which is the lithium composite transition metal oxide, according to the present invention is in the form of single particles having an average particle diameter ($D_{50}$) of 1 to 10 μm. More preferably, the average particle diameter ($D_{50}$) may be 2 to 7 μm, and even more preferably, 3 to 6 μm. When the positive electrode active material, which is the lithium composite transition metal oxide, is in the form of single particles formed of primary particles, thermal stability can be enhanced, and the generation of side reactions can be improved.

A method of forming single particles is not particularly limited, and the single particle may be commonly formed by performing over-firing while increasing a firing temperature. Also, the single particles may be prepared by using additives helpful for over-firing or by changing a starting material. When the single particles are formed as described above, thermal stability can be enhanced, and side reactions and resistance can be suppressed from being increased. The positive electrode active material in the form of single particles may be formed, for example, by adding a lithium source (e.g., LiOH, $Li_2CO_3$, etc.) to a composite transition metal hydroxide containing nickel, cobalt, and manganese (e.g., $Ni_{0.85}Co_{0.05}Mn_{0.10}(OH)_2$), then mixing them, and performing over-firing at 800° C. to 900° C. under an oxygen atmosphere for 10 hours to 25 hours.

According to the positive electrode active material of the present invention, a 100-nm region extending from the surface toward the center of a particle of the lithium composite transition metal oxide has crystal structures of a Fd3M space group and a Fm3m space group, and a phase ratio is 0.2 to 0.7, where the phase ratio is a ratio of a first portion of a maximum straight length occupied by the crystal structure of the Fd3M space group to a second portion of the maximum straight length occupied by the crystal structure of the Fm3m space group, where the maximum straight length is determined from a cross-sectional image of a single particle, where the image is obtained using transmission electron microscopy (TEM) and where the maximum straight length is perpendicular to the surface of the single particle.

In the present invention, the crystal structure and phase ratio of the positive electrode active material surface may be obtained by obtaining a cross-sectional image of a single particle using TEM, then analyzing a phase, and calculating a ratio (Fd3M/Fm3m) of the first portion to the second portion of the maximum straight length occupied by the crystal structures of the Fd3M space group and of the Fm3m space group, respectively.

According to the positive electrode active material of the present invention, since a 100-nm region extending from the surface toward the center of a single particle has a mixture of crystal structures of a Fd3M space group and a Fm3m space group, and the phase ratio satisfies the range of 0.2 to 0.7, the surface characteristics of a single particle can be improved, and charge/discharge efficiency, output characteristics, and high-temperature lifetime characteristics can be enhanced.

Specifically, when the phase ratio in the 100-nm region extending from the surface toward the center of the single particle is less than 0.2, rate characteristics and output characteristics (room-temperature and low-temperature output) may be degraded, and when the phase ratio exceeds 0.7, surface reactivity and lifetime characteristics (capacity retention rate and resistance increase rate) may be degraded.

More preferably, the phase ratio in the 100-nm region extending from the surface toward the center of the single particle may be 0.3 to 0.6, and even more preferably, 0.35 to 0.5.

In addition, more preferably, a 500-nm region extending from the surface toward the center of a particle of the lithium composite transition metal oxide may have crystal structures of a Fd3M space group and a Fm3m space group, and the phase ratio may be 0.2 to 0.7, and more preferably, 0.35 to 0.5.

The positive electrode active material according to the embodiment of the present invention may be formed by mixing a positive electrode active material and a lithium source and adjusting preparation process conditions such as adding firing additives during firing, adjusting a firing temperature, adjusting a molar ratio (Li/M) of lithium (Li) to metals (M) excluding lithium, adjusting the size and form of a raw material, and the like, but the present invention is not particularly limited to the above-described preparation process conditions.

A molar ratio (Li/M) of lithium (Li) to metals (M) excluding lithium in the positive electrode active material, which is the lithium composite transition metal oxide, may be 1.1 to 1.2, preferably 1.11 to 1.18, and more preferably 1.12 to 1.16. When the molar ratio (Li/M) of lithium (Li) to metals (M) excluding lithium satisfies the range of 1.1 to 1.2, it may contribute to enhancing crystallinity, and a flux effect may be produced during firing.

A cation mixing ratio of nickel cations in a lithium layer in the structure of the positive electrode active material, which is the lithium composite transition metal oxide, according to the present invention may be 1.5% or less, preferably 1.0% or less, and more preferably 0.8% or less. When the cation mixing ratio of nickel cations in a lithium layer satisfies the range of 1.5% or less, an irreversible site of a bulk part of the positive electrode active material is reduced, and thus diffusion of lithium ions may be promoted, and an increase in resistance may be improved, resulting in improvement in charge/discharge efficiency and the like.

<Positive Electrode and Lithium Secondary Battery>

Another aspect of the present invention provides a positive electrode for a secondary battery and a lithium secondary battery which include the above-described positive electrode active material.

Specifically, the positive electrode includes a positive electrode current collector and a positive electrode active material layer formed on the positive electrode current collector and including the above-described positive electrode active material.

In the positive electrode, the positive electrode current collector is not particularly limited as long as it does not cause a chemical change in the battery and has conductivity. For example, stainless steel, aluminum, nickel, titanium, fired carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of the positive electrode active material. Additionally, the positive electrode current collector may be used in any of various forms such as a film, a sheet, a foil, a net, a porous material, a foam, a non-woven fabric, and the like.

The positive electrode active material layer may include a conductive material and a binder in addition to the above-described positive electrode active material.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be typically included at 1 to 30 wt % with respect to the total weight of the positive electrode active material layer.

The binder serves to improve cohesion between positive electrode active material particles and adhesion between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluoro rubber, and various copolymers thereof, which may be used alone or in combination of two or more thereof. The binder may be included at 1 to 30 wt % with respect to the total weight of the positive electrode active material layer.

The positive electrode may be manufactured by a conventional method of manufacturing a positive electrode, except that the above-described positive electrode active material is used. Specifically, the positive electrode may be manufactured by applying a composition for forming a positive electrode active material layer, which includes the above-described positive electrode active material and, optionally, a binder and a conductive material, onto a positive electrode current collector, followed by drying and roll pressing. In this case, the types and contents of the positive electrode active material, the binder, and the conductive material have been described above.

As a solvent, a solvent generally used in the art may be used, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount just enough to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the composition for forming a positive electrode active material layer on a separate support and removing it from the support.

Still another aspect of the present invention provides an electrochemical device including the above-described positive electrode. The electrochemical device may specifically be a battery, a capacitor, or the like, and more specifically, a lithium secondary battery.

The lithium secondary battery specifically includes a positive electrode, a negative electrode disposed to face the positive electrode, a separator interposed between the positive electrode and the negative electrode, and an electrolyte. The positive electrode has been described above. In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer disposed on the negative electrode current collector.

The negative electrode current collector is not particularly limited as long as it does not cause a chemical change in the battery and has high conductivity. For example, copper, stainless steel, aluminum, nickel, titanium, fired carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 μm to 500 μm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material. For example, the negative electrode active material layer may be formed by applying a composition for forming a negative electrode, which includes a negative electrode active material and, optionally, a binder and a conductive material, onto a negative electrode current collector and then drying the same, or by laminating, on a negative electrode current collector, a film obtained by casting the composition for forming a negative electrode on a separate support and removing it from the support.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature fired carbon such as petroleum or coal tar pitch-derived cokes, and the like.

In addition, the binder and the conductive material are the same as those described for the positive electrode.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of the lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that is capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiNC_2F_5SO_2)_2$, $LiN(CF_3SO_2)_2$, LiCl, LiI, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexamethylphosphoric triamide, a nitrobenzene derivative, sulfur, a quinone imine dye, N-substituted oxazolidinone, N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included at 0.1 to 5 wt % with respect to the total weight of the electrolyte.

Since the lithium secondary battery including the positive electrode active material according to the present invention stably exhibits excellent discharge capacity, excellent output characteristics, and an excellent capacity retention rate as described above, it is useful in the field of portable devices such as mobile phones, notebook computers, digital cameras, and the like and electric vehicles such as hybrid electric vehicles (HEVs) and the like.

Accordingly, yet another aspect of the present invention provides a battery module including the lithium secondary battery as a unit cell and a battery pack including the battery module.

The battery module or battery pack may be used as a power source for one or more medium-to-large-sized devices selected from power tools; electric vehicles (EVs), hybrid electric vehicles, and plug-in hybrid electric vehicles (PHEVs); and systems for storing electric power.

Hereinafter, the present invention will be described in detail with reference to embodiments so that those skilled in the art can easily carry out the present invention. However, the present invention may be embodied in several different forms, and therefore, is not limited to embodiments described herein.

Example 1

A lithium source LiOH was added to a positive electrode active material precursor $Ni_{0.85}Co_{0.05}Mn_{0.10}(OH)_2$ so that a Li/metal (Ni, Co, and Mn) molar ratio was 1.15 and then mixed, and 1 wt % $B2O3$ and 1 wt % $K_2CO_3$ were added and mixed. For primary thermal treatment, the mixed powder was input into an alumina crucible. Afterward, firing was performed at 850° C. under an oxygen atmosphere for 20 hours to prepare a lithium composite transition metal oxide. Then, the lithium composite transition metal oxide was pulverized, rinsed, and dried to obtain powder, and the obtained powder was mixed with 0.1 wt % $H_3BO_3$ and secondarily thermally treated at 300° C. under an air atmosphere to obtain a positive electrode active material in the form of single particles.

Example 2

A positive electrode active material was prepared in the same manner as in Example 1 except that a Li/metal (Ni, Co, and Mn) molar ratio was 1.11, and a temperature for primary thermal treatment was 830° C.

Example 3

A positive electrode active material was prepared in the same manner as in Example 1 except that a Li/metal (Ni, Co, and Mn) molar ratio was 1.18, and a temperature for primary thermal treatment was 870° C.

Example 4

A positive electrode active material was prepared in the same manner as in Example 1 except that a Li/metal (Ni, Co, and Mn) molar ratio was 1.18, and a temperature for primary thermal treatment was 890° C.

Comparative Example 1

A positive electrode active material was prepared in the same manner as in Example 1 except that a Li/metal (Ni, Co, and Mn) molar ratio was 1.05, and a temperature for primary thermal treatment was 950° C.

Comparative Example 2

A positive electrode active material was prepared in the same manner as in Example 1 except that a Li/metal (Ni, Co, and Mn) molar ratio was 1.02, and a temperature for primary thermal treatment was 780° C.

Comparative Example 3

A positive electrode active material was prepared in the same manner as in Example 1 except that a Li/metal (Ni, Co, and Mn) molar ratio was 1.02, a temperature for primary thermal treatment was 780° C., and 1 wt % B203 and 1 wt % $K_2CO_3$ were not added.

Experimental Example 1: Confirmation of Surface Structure of Positive Electrode Active Material The positive electrode active materials prepared in Examples 1 to 4 and Comparative Examples 1 to 3 were subjected to surface phase analysis using transmission electron microscopy (TEM). Then, the maximum straight length of a portion occupied by each phase was measured, and a ratio thereof was calculated to measure a phase ratio of a Fd3M space group to a Fm3m space group in a 100-nm region extending from the surface toward the center of a particle. Results thereof are shown in the following Table 1, and a TEM image for Example 2 is shown in the FIGURE.

TABLE 1

| | Whether it is a single particle | Ratio (Fd3M/Fm3m) in 100-nm region |
|---|---|---|
| Example 1 | O | 0.2 |
| Example 2 | O | 0.45 |
| Example 3 | O | 0.6 |
| Example 4 | O | 0.7 |
| Comparative Example 1 | O | 0.05 |
| Comparative Example 2 | O | 1.2 |
| Comparative Example 3 | X | 1.2 |

Referring to Table 1, Examples 1 to 4 exhibited phase ratios (Fd3M/Fm3m) satisfying the range of 0.2 to 0.7, and Comparative Examples 1 to 3 exhibited phase ratios out of the range. Referring to the FIGURE, the crystal structures of Fd3M and Fm3m space groups of the particle surface can be determined, and it was confirmed that when the maximum straight length of each portion was measured, a phase ratio was 0.45.

Experimental Example 2: Charge/Discharge Efficiency

Each of the positive electrode active materials prepared in Examples 1 to 4 and Comparative Example 1, carbon black as a conductive material, and PVDF as a binder were mixed in a weight ratio of 96:2:2 in an N-methyl pyrrolidone solvent to prepare a positive electrode mixture (viscosity: 5,000 mPa s), and the positive electrode mixture was applied onto one surface of an aluminum current collector, dried at 130° C., and roll-pressed to manufacture a positive electrode.

As a negative electrode, lithium metal was used.

A porous polyethylene separator was interposed between the manufactured positive electrode and the negative electrode to manufacture an electrode assembly. Then, the electrode assembly was placed inside a case, and an electrolyte solution was injected into the case to manufacture a lithium secondary battery. In this case, the electrolyte solution was prepared by dissolving 1.0 M lithium hexafluorophosphate ($LiPF_6$) in an organic solvent containing ethylene carbonate, ethyl methyl carbonate, and diethyl carbonate (EC/EMC/DEC volumetric mixing ratio=3/4/3).

Each manufactured lithium secondary battery (half-cell) was subjected to a charging/discharging experiment by performing charging at 25° C. in the CC/CV mode of 0.2 C up to 4.25 V (final current: 1/20C) and discharging at a constant current of 0.2 C up to 3.0 V, and the charge/discharge capacity and efficiency thereof are shown in the following Table 2.

TABLE 2

| | Charge capacity (mAh/g) | Discharge capacity (mAh/g) | Efficiency (%) |
|---|---|---|---|
| Example 1 | 227.5 | 205.4 | 90.3 |
| Example 2 | 229.1 | 207.1 | 90.4 |
| Example 3 | 226.0 | 203.0 | 89.8 |
| Example 4 | 225.9 | 202.4 | 89.6 |
| Comparative Example 1 | 228.6 | 197.2 | 86.3 |

Referring to Table 2, it can be seen that the lithium secondary batteries including the positive electrode active materials according to Examples 1 to 4 exhibited increased capacity and increased efficiency compared to the lithium secondary battery including the positive electrode active material according to Comparative Example 1.

Experimental Example 3: Resistance Characteristics

The lithium secondary battery (half-cell) manufactured using each of the positive electrode active materials prepared in Examples 1 to 4 and Comparative Examples 1 and 2 as in Experimental Example 2 was discharged at 10% SOC with 1.0 C at 25° C., and direct current (DC) resistance was measured. Resistance was calculated based on voltage drop and applied current values when discharging was performed at the corresponding SOC with 1.0 C for 10 seconds. The resulting resistance values are shown in the following Table 3.

TABLE 3

| | Example 1 | Example 2 | Example 3 | Example 4 | Comparative Example 1 | Comparative Example 2 |
|---|---|---|---|---|---|---|
| Resistance ($\Omega$) (@SOC 10%) | 27.1 | 24.4 | 27 | 28.1 | 54 | 34 |

Referring to Table 3, it can be seen that the lithium secondary batteries including the positive electrode active materials of Examples 1 to 4 exhibited substantially improved resistance characteristics compared to the lithium secondary batteries including the positive electrode active materials of Comparative Examples 1 and 2.

Experimental Example 4: High-Temperature Lifetime Characteristics

A lithium secondary battery (full cell) was manufactured using each of the positive electrode active materials prepared in Examples 1 to 4 and Comparative Examples 1 to 3. The lithium secondary battery (full cell) was manufactured in the same manner as in Experimental Example 2 except that a negative electrode was manufactured by mixing graphite as a negative electrode active material, carbon black as a conductive material, and PVDF as a binder in a weight ratio of 96:2:2 in an N-methyl pyrrolidone solvent to prepare a negative electrode mixture, applying the negative electrode mixture onto one surface of a copper current collector, followed by drying at 130° C. and roll pressing.

The capacity retention rate and discharge resistance of each manufactured lithium secondary battery (full cell) were calculated by evaluating 100 cycles at 45° C. with 0.7 C/0.5 C. Resistance was calculated based on voltage drop and applied current values when a 4.25V fully charged cell was discharged with 0.5 C for 60 seconds. The capacity retention rate and resistance increase rate at the $100^{th}$ cycle are shown in the following Table 4.

Capacity retention rate=(Discharge capacity at $100^{th}$ cycle/Discharge capacity at $1^{st}$ cycle)×100

Resistance increase rate=(Discharge resistance at $100^{th}$ cycle/Discharge resistance at $1^{st}$ cycle)×100

TABLE 4

| | Example 1 | Example 2 | Example 3 | Example 4 | Comparative Example 1 | Comparative Example 2 | Comparative Example 3 |
|---|---|---|---|---|---|---|---|
| Capacity retention rate (%) (@100 cycle) | 88.8 | 89 | 89.9 | 90.1 | 82.6 | 85.0 | 85.2 |
| Resistance increase rate (%) (@100 cycle) | 122.1 | 115.7 | 112.6 | 108.8 | 155.3 | 145.0 | 138.5 |

Referring to Table 4, when the positive electrode active materials of Examples 1 to 4 were used, both a capacity retention rate and a resistance increase rate after 100 cycles were substantially improved compared to when the positive electrode active materials of Comparative Examples 1 to 3 were used.

Experimental Example 5: Continuous Charging Characteristics

A lithium secondary battery (half-cell) was manufactured using each of the positive electrode active materials prepared in Examples 1 to 4 and Comparative Examples 1 to 3, as in Experimental Example 2. The manufactured lithium secondary battery (half-cell) was charged up to 4.7 V and then maintained in the CV mode for 120 hours. In this case, the generated current value was integrated and divided by the time to calculate an average current value, and results thereof are shown in the following Table 5.

TABLE 5

| | Example 1 | Example 2 | Example 3 | Example 4 | Comparative Example 1 | Comparative Example 2 | Comparative Example 3 |
|---|---|---|---|---|---|---|---|
| Average current (@ 120 hr) (mAh) | 0.03 | 0.06 | 0.025 | 0.031 | 0.15 | 0.22 | 0.25 |

Referring to Table 5, when the positive electrode active materials of Examples 1 to 4 were used, the average current value generated for 120 hours was substantially low compared to when the positive electrode active materials of Comparative Examples 1 to 3 were used.

The invention claimed is:

1. A positive electrode active material for a secondary battery, comprising:
a lithium composite transition metal oxide comprising a center and a 100-nm region extending from a surface toward the center,
wherein the lithium composite transition metal oxide contains nickel, cobalt, and manganese and has a nickel content accounting for 60 mol % or more, based on the metals (M) contained in the lithium composite transition metal oxide, wherein M excludes lithium,
wherein the lithium composite transition metal oxide is in the form of single particles having an average particle diameter ($D_{50}$) of from 1 to 10 μm,
wherein the 100-nm region extending from the surface toward the center of a single particle comprises crystal structures of a Fd3M space group and a Fm3m space group,
wherein the center of the single particle comprises a layered crystal structure,
wherein the 100-nm region extending from the surface toward the center of the single particle comprises nickel, cobalt, and manganese, and the center of the single particle comprises nickel, cobalt, and manganese,
wherein a phase ratio is from 0.2 to 0.7 wherein the phase ratio is a ratio of maximum straight lengths of respective portions occupied by the Fd3M space group and the crystal structure of the Fm3m space group in the 100-nm region extending from the surface toward the center of the single particle, and
wherein the maximum straight length is determined from a cross-sectional image of the surface of a single particle, wherein the image is obtained using transmission electron microscopy (TEM), and wherein the maximum straight length is measured perpendicular to the surface of the single particle.

2. The positive electrode active material of claim 1, wherein the phase ratio is from 0.3 to 0.6.

3. The positive electrode active material of claim 1, wherein the average particle diameter ($D_{50}$) is from 2 to 7 μm.

4. The positive electrode active material of claim 1, wherein a cation mixing ratio of nickel cations in a lithium layer in the structure of the lithium composite transition metal oxide is 1.5% or less.

5. The positive electrode active material of claim 4, wherein a cation mixing ratio of nickel cations in a lithium layer in the structure of the lithium composite transition metal oxide is 1.0% or less.

6. The positive electrode active material of claim 1, wherein a molar ratio of lithium (Li) to M in the lithium composite transition metal oxide is from 1.1 to 1.2.

7. The positive electrode active material of claim 1, wherein the lithium composite transition metal oxide is represented by the following Chemical Formula 1:

$$Li_aNi_{1-b-c-d}Co_bMn_cQ_dO_{2+\delta}$$ [Chemical Formula 1]

in Chemical Formula 1, Q is one or more elements selected from the group consisting of Al, Mg, V, Ti, and Zr, and $1.0 \leq a \leq 1.2$, $0 < b \leq 0.4$, $0 < c \leq 0.3$, $0 \leq d < 0.1$, $0 < b+c+d \leq 0.4$, and $-0.1 \leq \delta \leq 1.0$.

8. A positive electrode for a secondary battery, comprising the positive electrode active material according to claim 1.

9. A lithium secondary battery comprising the positive electrode according to claim 8.

10. The positive electrode active material of claim 1, wherein the single particle is formed of at most 10 primary particles.

\* \* \* \* \*